(12) United States Patent
Maple

(10) Patent No.: US 11,312,499 B2
(45) Date of Patent: Apr. 26, 2022

(54) AIR INLET WITH INTEGRATED FLUID DIVERTER

(71) Applicant: Textron Aviation Inc., Wichita, KS (US)

(72) Inventor: Raymond Charters Maple, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 323 days.

(21) Appl. No.: 16/298,009

(22) Filed: Mar. 11, 2019

(65) Prior Publication Data

US 2019/0283861 A1    Sep. 19, 2019

Related U.S. Application Data

(60) Provisional application No. 62/642,794, filed on Mar. 14, 2018.

(51) Int. Cl.
*B64D 13/00* (2006.01)
*B64D 33/02* (2006.01)
*B64C 7/00* (2006.01)
*B64C 21/00* (2006.01)

(52) U.S. Cl.
CPC ............... *B64D 13/00* (2013.01); *B64C 7/00* (2013.01); *B64C 21/00* (2013.01); *B64D 33/02* (2013.01); *B64D 2241/00* (2013.01); *Y02T 50/10* (2013.01)

(58) Field of Classification Search
CPC .............. B64D 33/022; B64D 33/0213; B64D 2033/0226; B64D 2241/00; B64D 13/00
See application file for complete search history.

(56) References Cited

U.S. PATENT DOCUMENTS

| | | | |
|---|---|---|---|
| 5,779,189 A | 7/1998 | Hamstra et al. | |
| 6,634,595 B2 | 10/2003 | Koncsek et al. | |
| 8,393,566 B2 | 3/2013 | Siercke et al. | |
| 9,051,057 B2 * | 6/2015 | Da Silva | B64D 41/00 |
| 9,862,482 B2 | 1/2018 | Huynh et al. | |
| 2015/0167552 A1 * | 6/2015 | Prouteau | F02C 7/18 |
| | | | 137/15.1 |

* cited by examiner

*Primary Examiner* — Philip J Bonzell
*Assistant Examiner* — Ashesh Dangol
(74) *Attorney, Agent, or Firm* — Erise IP, P.A.

(57) ABSTRACT

A fluid diverting air inlet includes an intake opening through an outer surface of an enclosure for receiving air flowing outside the outer surface. The intake opening ramps downwardly below the outer surface to define an intake passageway. An air diversion device is formed by lateral sidewalls of the intake opening that extend vertically above the outer surface. The lateral sidewalls converge together at an upstream end of the air inlet, and the lateral sidewalls diverge apart towards a downstream end of the air inlet. Flanges extend outwardly from the tops of the lateral sidewalls such that divided air passageways for boundary layer fluids are formed on each side of the air diversion device. The sidewalls and flanges are integrated with the air inlet such that fluid moving immediately adjacent the outer surface of the enclosure is diverted around the air inlet to avoid ingestion into the intake opening.

10 Claims, 5 Drawing Sheets

DIRECTION OF AIR FLOW

AIR INLET WITH INTEGRATED FLUID DIVERTER

CROSS-REFERENCE TO RELATED APPLICATIONS

This application claims the benefit of U.S. Provisional Patent Application Ser. No. 62/642,794, entitled Air Inlet with Integrated Fluid Diverter and filed Mar. 14, 2018, the disclosure of which is herein incorporated by reference in its entirety.

BACKGROUND

1. Field of the Disclosure

Embodiments of this disclosure relate generally to air inlets for aircraft, and more specifically to fluid-diverting means for an air inlet.

2. Description of the Related Art

Air inlets provide an air intake onboard conventional aircraft. Various types of diverter mechanisms are known for use in conjunction with air inlets. For example, U.S. Pat. No. 9,862,482 to Huynh et al. discloses a variable geometry flush boundary layer diverter that includes a door for selectively diverting boundary layer air into a recessed passage. U.S. Pat. No. 8,393,566 to Siercke et al. discloses an air inlet for a vehicle having profile components added to the sides and/or a border edge of a conventional NACA-style inlet. U.S. Pat. No. 6,634,595 to Koncsek et al. discloses an engine inlet having an auxiliary air flow duct and a diverter valve for diverting boundary layer flow. U.S. Pat. No. 5,779,189 to Hamstra et al. discloses a diverterless engine inlet that includes a raised bump with a forward swept, aft-closing cowl to divert boundary layer air from the inlet.

SUMMARY

In an embodiment, an air inlet includes an intake opening located in an outer surface of an enclosure for receiving air moving outside the enclosure. A fluid diverter is integrated with the air inlet such that fluid moving immediately adjacent the outer surface of the enclosure is diverted around the air inlet to avoid ingestion into the intake opening.

In another embodiment, a fluid diverting air inlet includes an intake opening formed through an outer surface of an aircraft. The intake opening is configured to receive air for use in the aircraft. The intake opening ramps downwardly below the outer surface to define an intake passageway. An air diversion device is formed by lateral sidewalls of the intake opening that extend vertically above the outer surface. The lateral sidewalls converge together at an upstream end of the air inlet, and the lateral sidewalls diverge apart towards a downstream end of the air inlet. Flanges extend outwardly from the tops of the lateral sidewalls such that divided air passageways for boundary layer fluids are formed on each side of the air diversion device.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Air for ventilation and cooling of aircraft compartments and equipment is commonly supplied by means of an inlet installed in an outer surface of the aircraft. Conventional air inlets are typically installed flush with the outer surface such that air drawn into the inlet comes largely from a fluid boundary layer that develops immediately adjacent to the outer surface during flight. A disadvantage of drawing air from the fluid boundary layer is that fluid which has leaked from the aircraft upstream of the inlet tends to remain within the fluid boundary layer and is therefore drawn into the inlet. In the case of a flammable fluid, such as fuel and hydraulic fluid, an increased risk exists for fires and/or explosions. Federal Aviation Regulations (FAR) require that aircraft incorporate features to minimize the risk of fire and explosions due to leaking flammable fluid.

Embodiments of the present disclosure provide an air inlet with an integrated fluid diverter installed in an outer surface of an enclosure. The integrated fluid diverter raises an opening of the inlet above the outer surface such that air drawn into the inlet is from outside the fluid boundary layer. The integrated fluid diverter also provides a channel to divert air adjacent the outer surface thereby preventing reentry of leaking fluids within the fluid boundary layer. When employed onboard aircraft, the air inlet with an integrated fluid diverter provides a means to avoid ingesting hazardous fluids without inhibiting air intake. Embodiments of the present disclosure help to meet the requirements of FAR Section 25.863 without degraded inlet performance in a non-obtrusive and aesthetically pleasing appearance, and without the use of moving parts.

Figure 1:
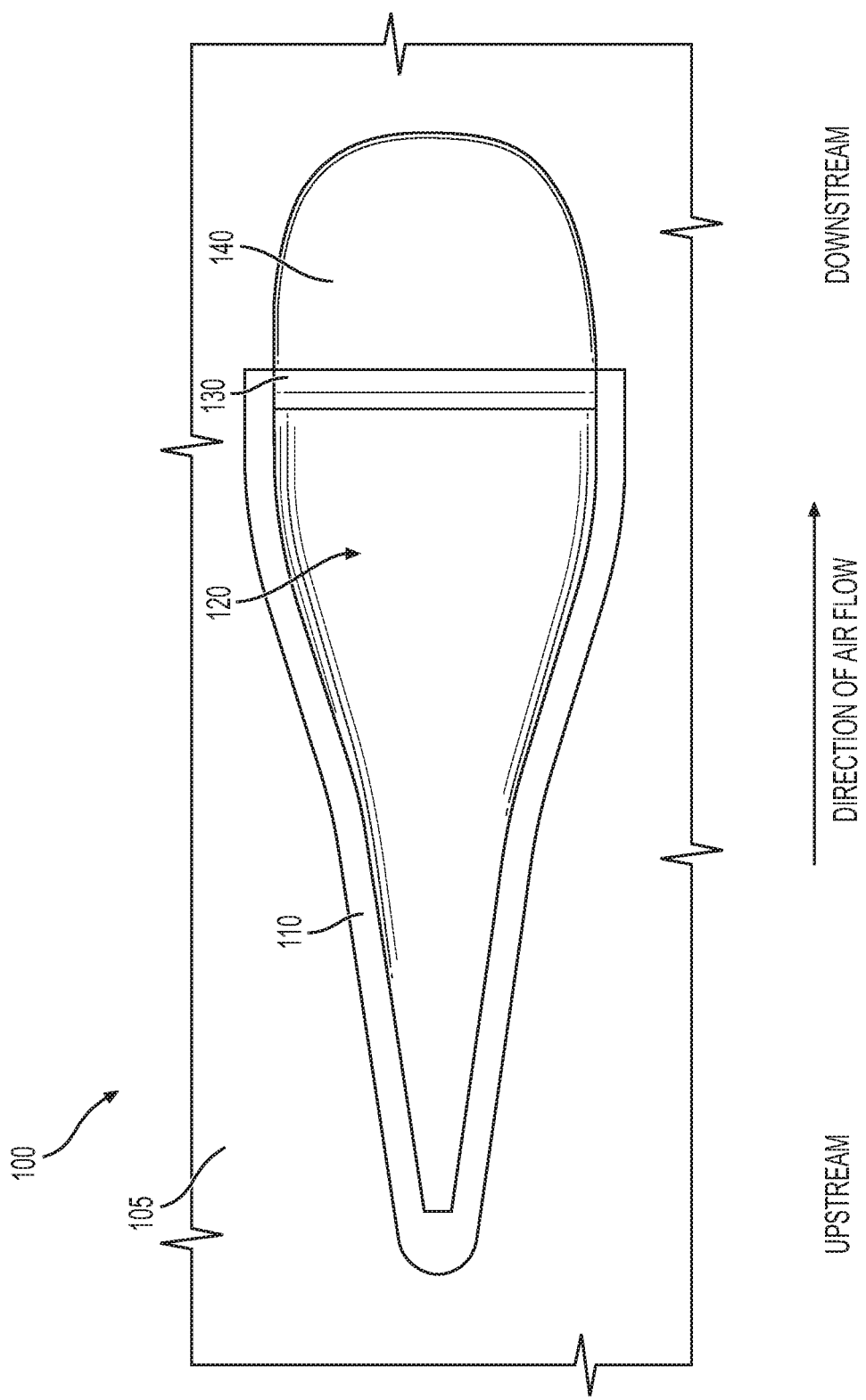
FIG. 1 is a top-down view of an air inlet with an integrated fluid diverter, in an embodiment.

FIG. 1 is a top-down view of an exemplary air inlet 100 with an integrated fluid diverter. As depicted in FIG. 1, air inlet 100 is integrated into outer surface 105 of an enclosure. In certain embodiments, outer surface 105 is an aircraft skin and the enclosure is an aircraft fuselage. Air inlet 100 includes a diverter flange 110, an intake opening 120, an inlet lip 130, and an aerodynamic fairing 140, which are further described below. Air inlet 100 is oriented with respect to a nominal direction of air flow as indicated with an arrow labeled in FIGS. 1-4. Air inlet is shaped such that the upstream end has a narrow opening, and intake opening 120 broadens to form a wide opening along the downstream end at inlet lip 130. Diverter flange 110 is positioned along upstream edges of intake opening 120 and extends to inlet lip 130 where it terminates. Diverter flange 110 is raised above outer surface 105 and aligned substantially parallel with outer surface 105, as best viewed in FIG. 2.

Figure 2:
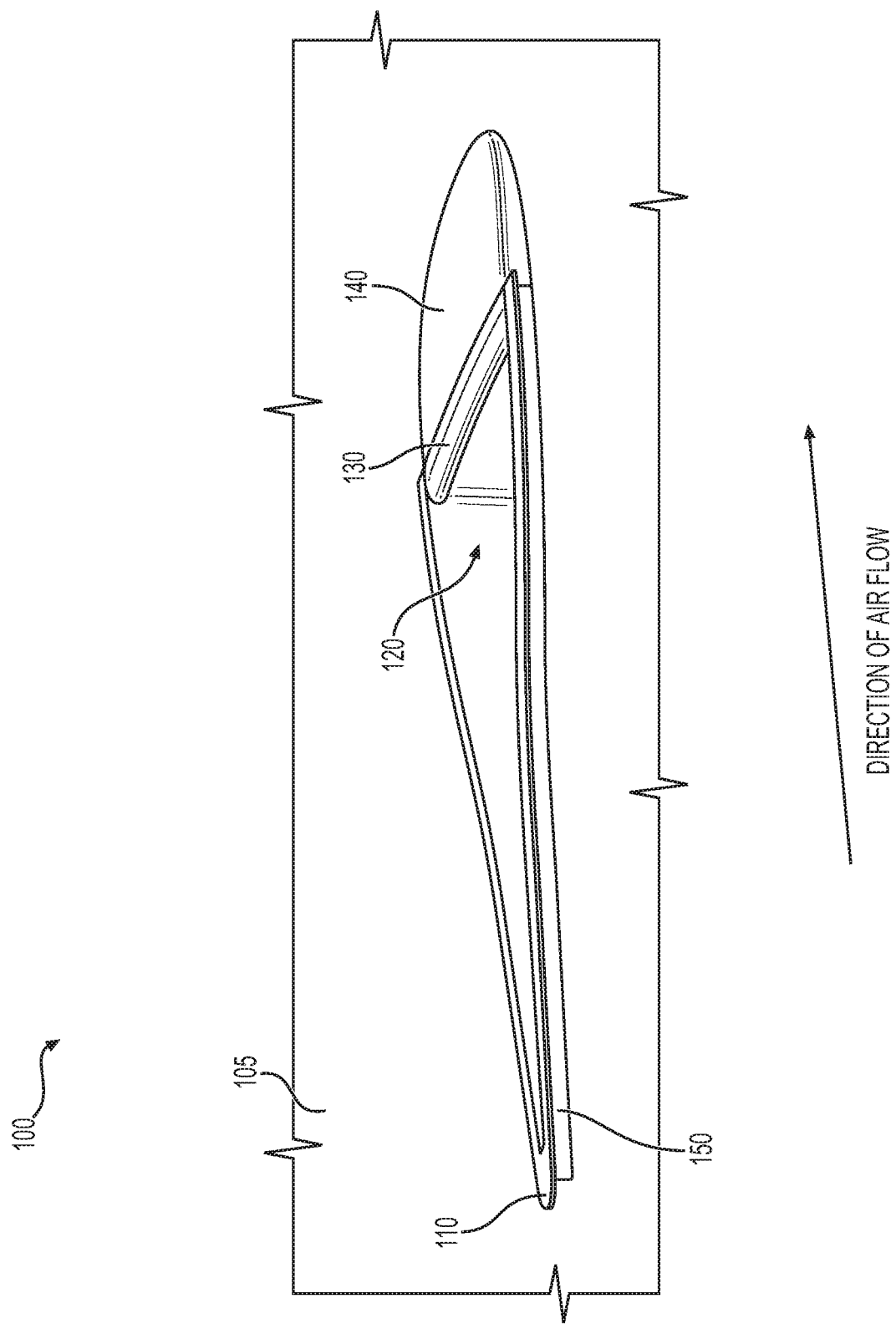
FIG. 2 is a perspective view of the air inlet of FIG. 1.

FIG. 2 is a perspective view of air inlet 100. A diverter sidewall 150 is adapted to raise diverter flange 110 above outer surface 105. In other words, diverter flange extends outwardly from the top of diverter sidewall 150. Together, diverter flange 110 and diverter sidewall 150 form a diverter channel 155, which is best viewed in FIGS. 4 and 5, around the sides of intake opening 120. Diverter channel 155 provides a bypass channel that diverts fluid flow to bypass intake opening 120 thereby preventing surface-attached fluid ingestion, while preserving the air intake function of air inlet 100. Intake opening 120 provides a passageway that ramps downwardly below outer surface 105 for receiving air beneath inlet lip 130, as best viewed in FIG. 3.

Figure 3:
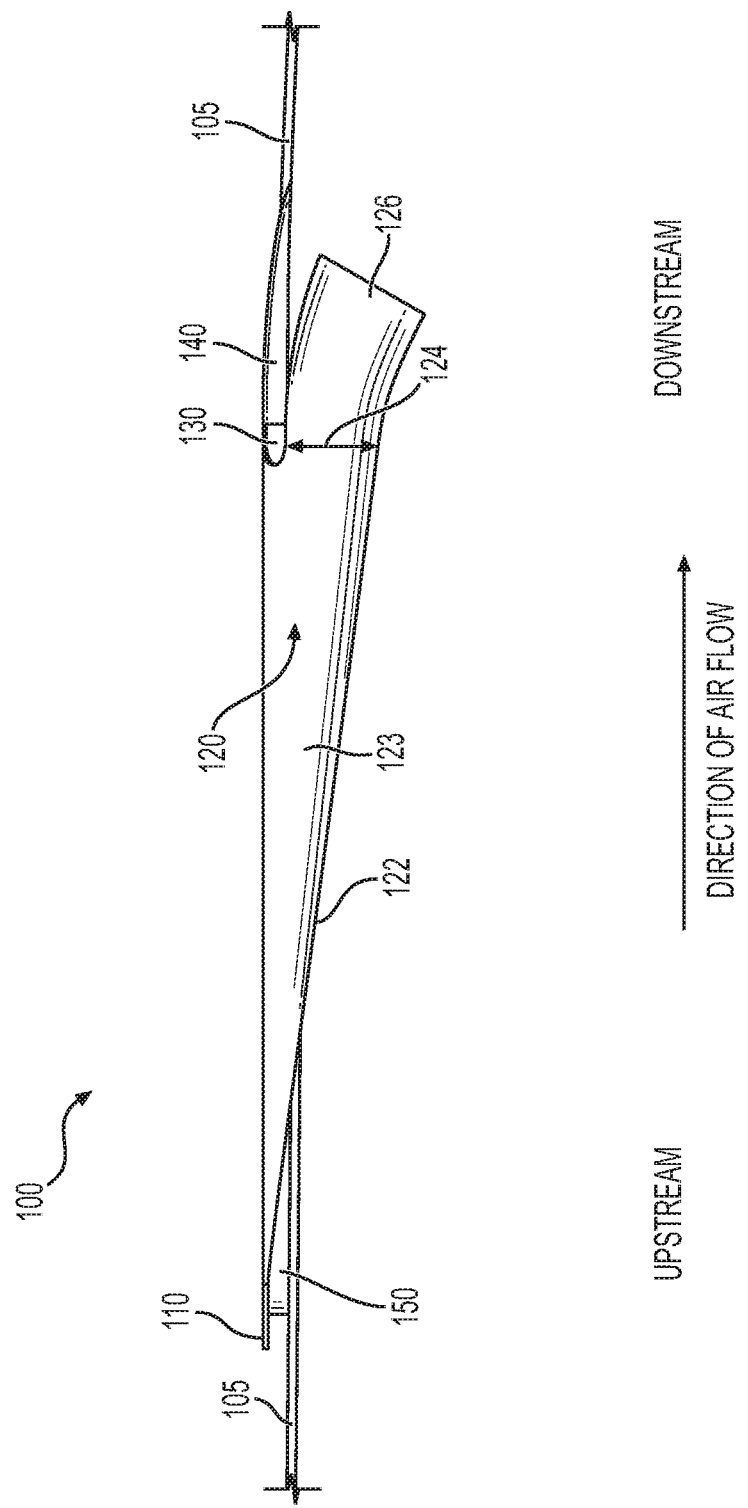
FIG. 3 is a cross-sectional side view of the air inlet of FIG. 1.
Figure 4:
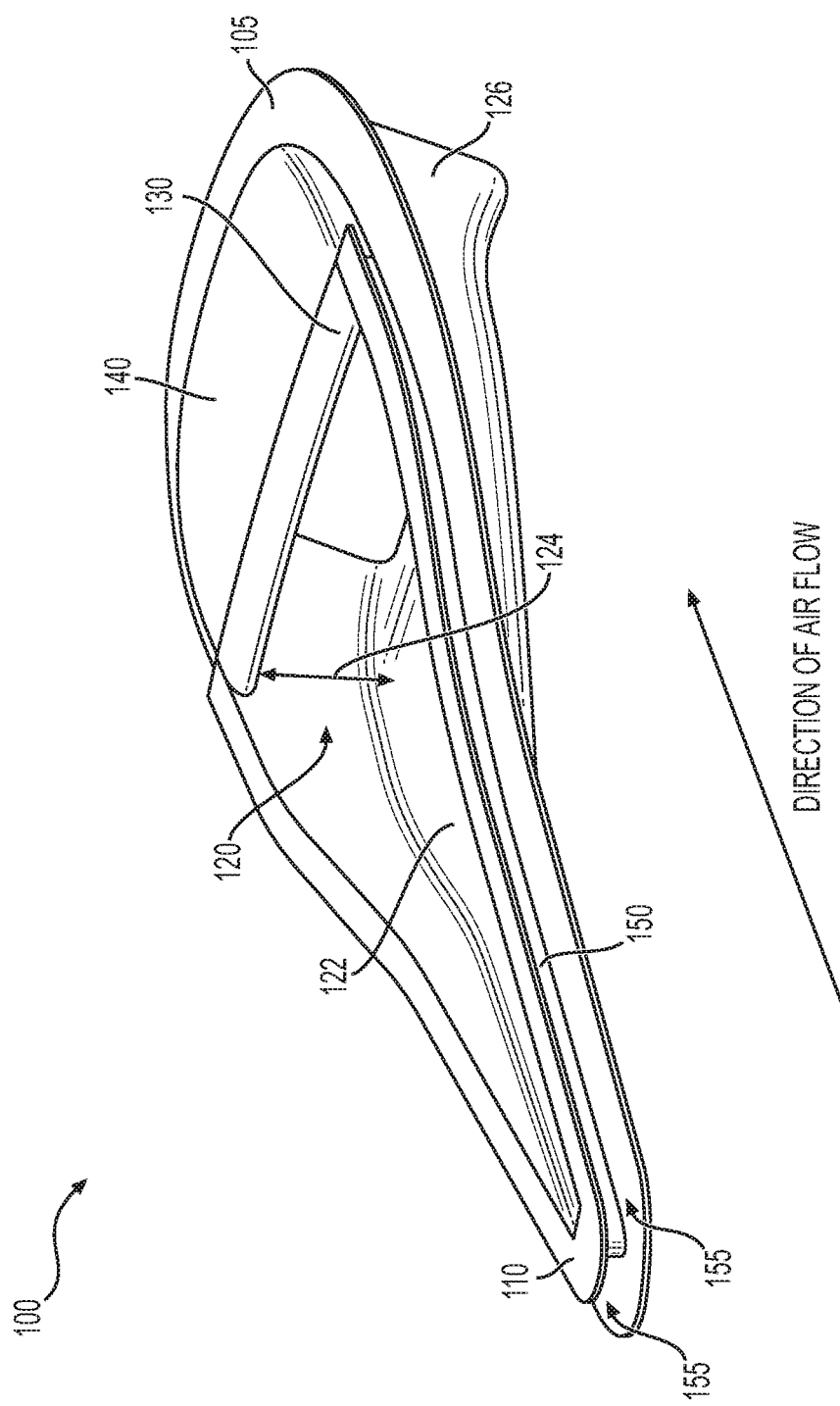
FIG. 4 is a perspective view of air inlet of FIG. 1 with portions of an outer surface removed for viewing beneath.

FIG. 3 is a cross-sectional side view of air inlet 100. FIG. 4 is a perspective view of air inlet 100 with portions of outer surface 105 removed for clarity of illustration. FIGS. 3 and 4 are best viewed together with the following description.

An inlet ramp 122 forms a lower surface of air inlet 100 that angles downwardly from diverter flange 110 to a duct 126 beneath aerodynamic fairing 140. Aerodynamic fairing 140 is adapted to provide a low drag connecting surface between inlet lip 130 and outer surface 105. Diverter flange 110 and diverter sidewall 150 both terminate at inlet lip 130, and aerodynamic fairing 140 provides a smooth transition from the end of diverter sidewall 150 to outer surface 105, as best viewed in FIGS. 2 and 4. A size and shape of aerodynamic fairing 140 may be customized for each installation to minimize aerodynamic drag with consideration for geometric constraints and aesthetic appearance.

Air inlet 100 includes an inlet sidewall 123 on both sides to complete a fluid path of intake opening 120 to air duct 126. Inlet sidewall 123 connects seamlessly with diverter sidewall 150 for integrating the fluid diverter functionality with intake opening 120. In certain embodiments, an upper portion of inlet sidewall 123 forms the diverter sidewall 150 as it extends above outer surface 105. In some embodiments, inlet sidewall 123 has two lateral sidewalls, one on either side of air inlet 100. The two lateral sidewalls converge to meet at the upstream end of intake opening 120 and diverge as the sidewalls extend around intake opening 120 towards the downstream end to define a width of intake opening 120. Likewise, diverter flange 110 may include two flanges that meet at the narrow (upstream) end of intake opening 120. The portion of the sidewalls 123 that extend above outer surface 105 together with diverter flanges 110 form an air diverting device that is integrated with intake opening 120 to form air inlet 100 with an integrated fluid diverter.

Air duct 126 is for example a conduit or diffuser for directing airflow. A gap between inlet lip 130 and inlet ramp 122 may be known as an inlet throat 124. In certain embodiments, inlet lip 130 includes a leading edge with a curved profile that faces upstream. The curved profile is adapted for separating a portion of air flow from above air inlet 100 into inlet throat 124 while minimizing drag. In some embodiments (e.g., for small inlets), the leading edge of inlet lip 130 is too thin for practical manufacturing of a curved profile. Instead, another shape such as a straight edge or a pointed edge may be used depending on the method of manufacture.

Figure 5:
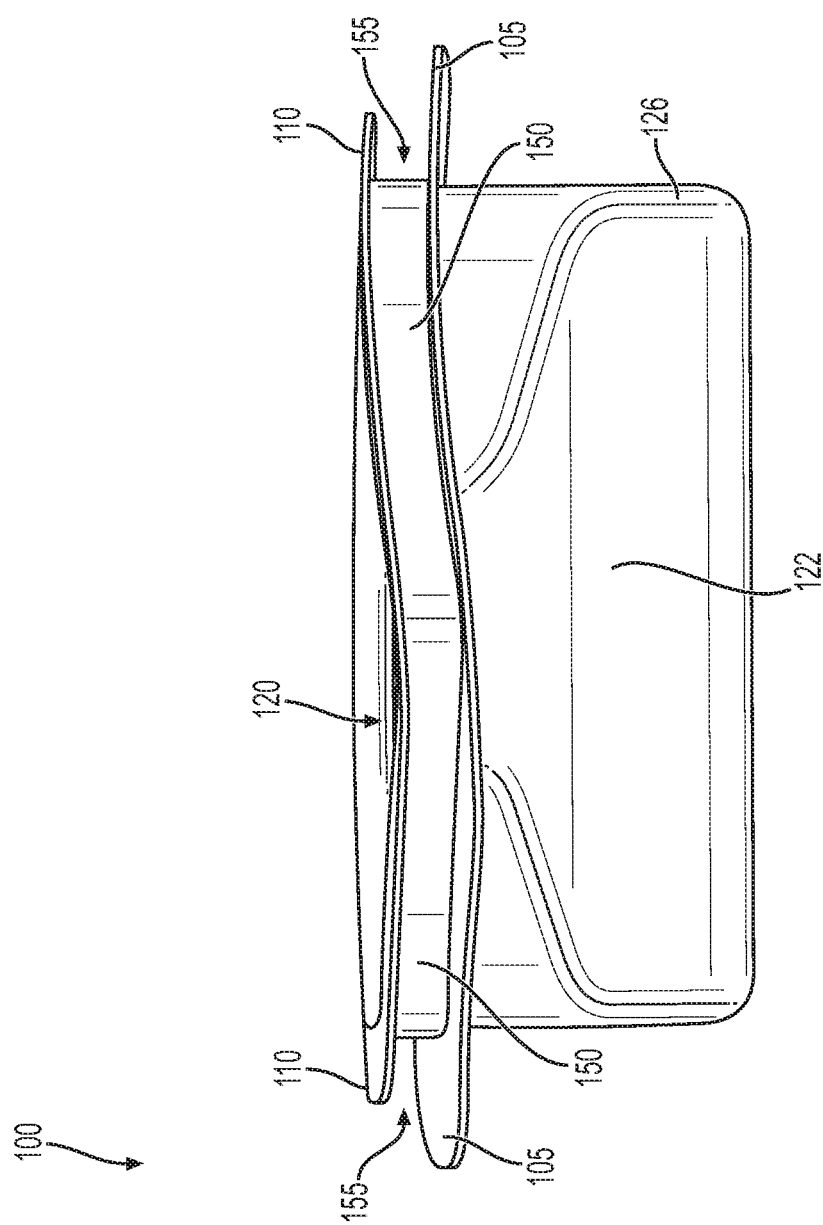
FIG. 5 is a front view of the air inlet of FIG. 4.

Inlet ramp 122, inlet sidewall 123, inlet throat 124, and air duct 126 together form a submerged inlet (e.g., a NACA inlet). This sort of inlet may be used to provide air for any variety of purposes (e.g., use for ventilation, cooling, etc.). Typically, a NACA-style submerged inlet is installed flush with outer surface 105, which results in air from the boundary layer adjacent outer surface 105 being drawn into the inlet opening, including leaking fluids moving along outer surface 105. In contrast, air inlet 100 protrudes outside outer surface 105 due to diverter sidewall 150, which extends above outer surface 105. As depicted in FIGS. 4 and 5, a diverter channel 155 is formed between diverter flange 110 and outer surface 105 on both sides of air inlet 100 for preventing fluid adjacent outer surface 105 from entering intake opening 120.

FIG. 5 is a front view of air inlet 100. Diverter flange 110 and diverter sidewall 150 are extended and aerodynamically shaped to allow boundary-layer fluids to smoothly flow to either side of air inlet 100 via diverter channels 155. As depicted in FIG. 5, diverter channels 155 are formed between diverter flanges 110 and outer surface 105 adjacent diverter sidewalls 150. Diverter channels 155 are adapted to divide air flow around intake opening 120 along divided air passageways. The air passageways may be bypass channels formed along each side of the air inlet for directing boundary layer fluid flow away from the intake opening. The bypass channels are beneath an underside surface of the diverter flanges 110, outside a facade of the lateral diverter sidewalls 150, and above the outer surface 105. Also, as depicted in FIG. 5, outer surface 105 may have a curvature, and diverter flange 110 may include a generally matching curvature such that diverter flange 110 is substantially parallel with outer surface 105.

A height of diverter sidewall 150 and a width of diverter flange 110 are designed to be sufficiently tall and wide enough, respectively, to deflect surface fluids to either side of intake opening 120 while minimizing drag and preserving sufficient air intake into intake opening 120. In certain embodiments, the height of diverter sidewall 150 and the width of diverter flange 110 may be based on a local boundary layer thickness and an expected volume of fluid to be diverted. For example, an inlet located in a region with a large anticipated fluid volume will generally require a taller diverter sidewall 150 and a wider diverter flange 110 compared to an inlet located in a region with a small anticipated fluid volume.

Air inlet 100 may be used to provide a low-drag source of air when ingestion of surface attached fluids is undesirable, such as with civilian and military aircraft, as well as manned and unmanned aircraft. Due to the diverter flange 110 and diverter sidewall 150 being integrated with the air inlet 100, the volume of air entering intake opening 120 is substantially maintained compared with conventional submerged inlets that lack a fluid diverter. If a separate (non-integrated) fluid diverter is retrofitted upstream of an existing submerged inlet, the fluid diverter disturbs air flow headed towards the inlet opening, thus significantly reducing air intake. Therefore, embodiments of the present disclosure provide a significant improvement over non-integrated fluid diverters.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:
1. An air inlet, comprising:
    an outer surface of an enclosure;
    an intake opening located in the outer surface of the enclosure for receiving a flow of air from outside the enclosure, wherein the intake opening is narrower at an upstream end of the air inlet, and the intake opening is wider at a downstream end of the air inlet;

a sidewall mechanically coupled with the outer surface around a portion of the intake opening, wherein the sidewall extends upwardly above the outer surface and downwardly below the outer surface;

an inlet ramp angled downwardly from the upstream end of the air inlet towards the downstream end of the air inlet, the inlet ramp being mechanically coupled with the sidewall above the outer surface at the upstream end and below the outer surface at the downstream end;

an inlet lip positioned transversely across the intake opening at the downstream end of the intake opening, wherein the inlet lip comprises a leading edge with a curved profile that faces upstream for separating a portion of air flow while minimizing drag;

a raised flange mechanically coupled with the sidewall that extends transversely away from the intake opening, the raised flange being elevated over the outer surface, wherein the raised flange and the sidewall form a fluid diverter that diverts fluid immediately outside the outer surface of the enclosure to flow around the air inlet, thereby avoiding ingestion of the fluid into the intake opening; and an aerodynamic fairing mechanically coupled on the outside of the aircraft skin immediately downstream of the inlet lip, wherein the aerodynamic fairing ramps downwardly from the inlet lip to the aircraft skin to provide a low drag connecting surface between the inlet lip and the aircraft skin.

2. The air inlet of claim 1, further comprising a channel formed between the outer surface, the sidewall, and the raised flange, the channel adapted to divert a boundary layer of fluid flow around the intake opening.

3. The air inlet of claim 1, wherein the inlet lip is located above the inlet ramp forming an inlet throat therebetween.

4. The air inlet of claim 3, further comprising an aerodynamic fairing mechanically coupled on the outside of the outer surface immediately downstream of the inlet lip, wherein the aerodynamic fairing ramps downwardly from the inlet lip to the outer surface to provide a low drag connecting surface between the inlet lip and the outer surface.

5. The air inlet of claim 3, further comprising a duct mechanically coupled with the inlet ramp and the sidewall at the inlet throat, the duct being configured for receiving the flow of air from the intake opening.

6. A fluid diverting air inlet, comprising:
a raised intake opening formed through an outer surface of an aircraft, the raised intake opening configured to receive air for use in the aircraft;
the raised intake opening having a ramp angled downwardly below the outer surface to define an intake passageway, such that the raised intake opening is shallower at an upstream end and deeper at a downstream end with respect to a nominal direction of airflow;
lateral sidewalls that extend seamlessly from the ramp below the outer surface upwardly to form the raised intake opening above the outer surface, the lateral sidewalls converging together at an upstream end of the air inlet, and the lateral sidewalls diverging apart towards a downstream end of the air inlet such that the raised intake opening is narrower at an upstream end and wider at a downstream end;
flanges that extend outwardly from the tops of the lateral sidewalls such that divided air passageways for boundary layer fluids are formed beneath the flanges on each side of the raised intake opening; and
an aerodynamic fairing mechanically coupled on the outside of the aircraft skin immediately downstream of the inlet lip, wherein the aerodynamic fairing ramps downwardly from the inlet lip to the aircraft skin to provide a low drag connecting surface between the inlet lip and the aircraft skin.

7. The fluid diverting air inlet of claim 6, wherein the divided air passageways comprise bypass channels formed along each side of the raised intake opening for directing boundary layer fluid flow around the raised intake opening, the bypass channels being (i) beneath an underside surface of the flanges; (ii) outside a facade of the lateral sidewalls; and, (iii) above the outer surface.

8. The fluid diverting air inlet of claim 6, wherein the outer surface is an aircraft skin, and the air inlet is installed in the aircraft skin for providing a low-drag source of air that avoids ingestion of surface attached fluids.

9. The fluid diverting air inlet of claim 6, wherein the outer surface is curved and the flanges are curved to match the outer surface such that the flanges are substantially parallel with the outer surface.

10. An integrated fluid diverter for an air inlet, comprising:
a ramp angled downwardly through an opening in an aircraft skin, wherein the ramp extends above the aircraft skin at an upstream end and below the aircraft skin at a downstream end;
a pair of sidewalls mechanically coupled with the downwardly angled ramp, wherein the pair of sidewalls extend above the opening, and the pair of sidewalls diverge to form a narrower upstream portion of the opening and a wider downstream portion of the opening;
a flange extending outwardly from the pair of sidewalls above the aircraft skin, the flange being configured to divert air flow immediately adjacent the aircraft skin from entering the opening;
an inlet lip positioned transversely across the opening at the downstream end of the ramp, wherein the inlet lip is aligned with the flange and located above the ramp forming an inlet throat therebetween, and the inlet lip having a low profile in line with the raised flange for minimizing drag; and
an aerodynamic fairing mechanically coupled on the outside of the aircraft skin immediately downstream of the inlet lip, wherein the aerodynamic fairing ramps downwardly from the inlet lip to the aircraft skin to provide a low drag connecting surface between the inlet lip and the aircraft skin.

* * * * *